Jan. 22, 1957 F. P. SCHUR 2,778,225
COMBINATION TIRE PRESSURE GAUGE AND REGULATOR
Filed May 25, 1953

INVENTOR.
FREDERICK P. SCHUR
BY Herman L. Gordon
ATTORNEY

United States Patent Office 2,778,225
Patented Jan. 22, 1957

2,778,225
COMBINATION TIRE PRESSURE GAUGE AND REGULATOR

Frederick P. Schur, Arlington, Va.

Application May 25, 1953, Serial No. 357,300

2 Claims. (Cl. 73—389)

This invention relates to tire pressure gauges, and more particularly to a combination tire pressure gauge and pressure regulator.

A main object of the invention is to provide a novel and improved combination tire pressure gauge and pressure regulator, the improved gauge and regulator being simple in construction, being easy to operate, and being arranged to be employed either as a gauge device for measuring the fluid pressure in a tire or other vessel, or as a means for automatically bleeding the tire or vessel to reduce the fluid pressure therein to a predetermined desired value.

A further object of the invention is to provide an improved combination pressure gauge and regulator which is inexpensive to manufacture, which is rugged in construction, and which is easy to calibrate.

Further objects and advantages of the invention will become apparent from the following description and claims, and from the accompanying drawings, wherein:

Figure 3:
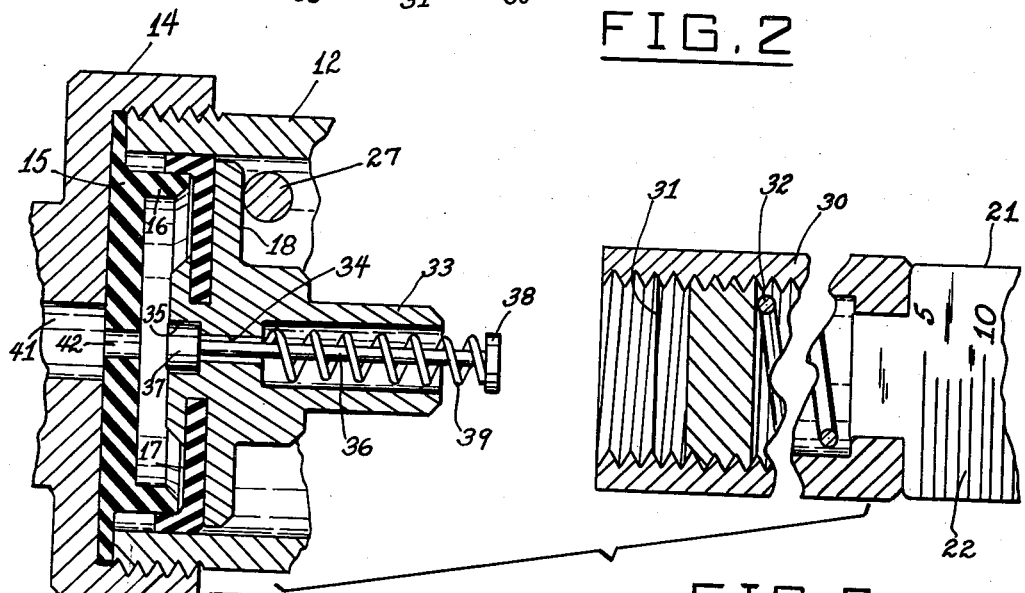
Figure 3 is an enlarged fragmentary cross-sectional detail view taken on line 3—3 of Figure 2.
Figure 4:
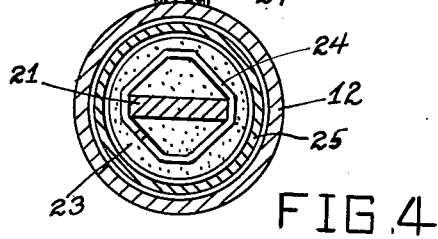
Figure 4 is an enlarged transverse cross-sectional view taken on line 4—4 of Figure 2.

Referring to the drawings, the improved tire pressure gauge and regulator is designated generally at 11. The device 11 comprises a tubular barrel 12 provided at one end with an apertured head 13 for engagement with the mouth of a tire valve stem. As shown, the head 13 is formed with the internally threaded annular flange 14 which is threadedly engaged with the end of barrel 12. Seated in the flange is the annular sealing gasket 15 of resilient deformable material, such as rubber or the like, which is clampingly engaged by the rim of barrel 12, as shown in Figure 3. The gasket 15 is integrally formed with the annular rib 16 which is normally received in the annular cup-like gasket 17 secured to a piston 18 in the barrel 12.

The barrel 12 is formed at its end opposite head 13 with an inwardly directed annular flange 19 against which is disposed the centrally slotted circular end wall member 20. Designated at 21 is a flat, blade-like rod member which extends slidably through the central slot in the end wall member 20. The face of rod member 21 is inscribed with a pressure scale 22.

Figure 1:
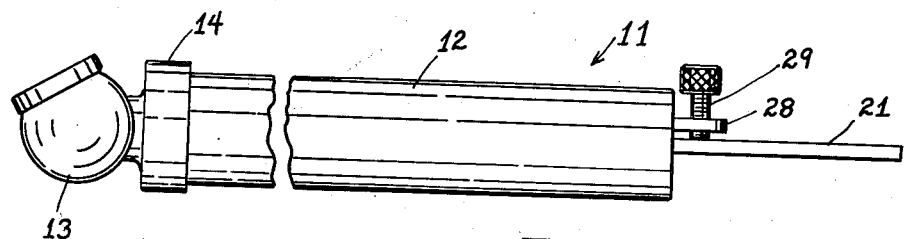
Figure 1 is a side elevational view of an improved combination tire pressure gauge and pressure regulator constructed in accordance with the present invention.
Figure 2:
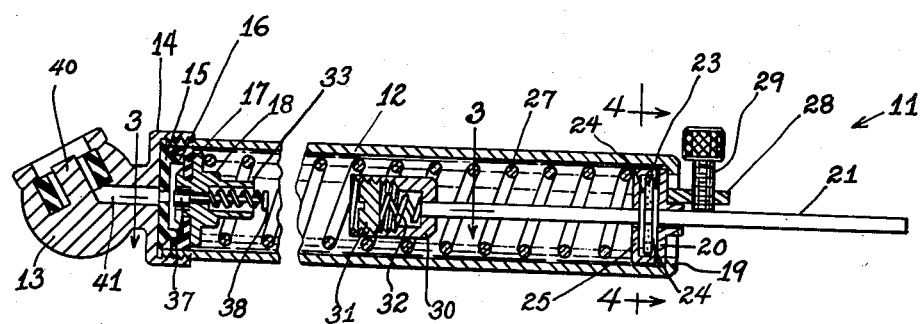
Figure 2 is a vertical longitudinal cross-sectional view taken through the combination tire pressure gauge and regulator illustrated in Figure 1.

Mounted on the rod 21 inside the barrel 12 and frictionally engaging the rod is a friction disc 23 of felt or similar deformable friction material, respective split friction rings 24, 24, of spring wire or the like, being engaged on the rod on opposite sides of the friction disc to support the friction disc in a position perpendicular to the axis of the rod. Slidably engaged on the rod inwardly adjacent the disc 23 and its supporting rings 24 is the cup washer 25 of rigid material. A relatively heavy coiled spring 27 surrounds the rod 21 and bears between washer 25 and piston 18, as shown in Figure 2, biasing the piston against the annular rib 16 of gasket 15.

Rigidly secured to the circular wall member 20 and extending parallel to the face of rod 21 is a lug 28, and threadedly engaged through said lug is the clamping screw 29, said screw being clampingly engageable with the rod 21 to lock said rod in a predetermined extended position relative to the end wall member 20.

Rigidly secured to the inner end of rod 21 is a generally cylindrical cup member 30 in which is threadedly engaged the adjustable abutment element 31. A coiled spring 32 is disposed in the cup member 30 between its end wall and the screw abutment element 31 to eliminate looseness of the abutment element in the cup member.

Piston 18 is formed with an axial sleeve element 33 receivable in the cup member 30. Said piston is further formed with an axial air passage 34 communicating at one end with a cylindrical valve seat 35 and at the other end with the interior of sleeve 33. Loosely disposed in the axial air passage 34 is the plunger rod 36 which is provided on one end with the cylindrical valve head 37, loosely received in the seat 35, and which extends through and beyond the sleeve 33 at its other end. At said other end, the plunger rod 36 is provided with the enlarged abutment element 38. A coiled spring 39 surrounds the plunger rod 36 and is received in sleeve 33, one end of the spring 39 bearing on abutment element 38 and the other end bearing on the annular end wall of sleeve 33 adjacent air passage 34, biasing the valve head 37 into sealing engagement with the annular wall of valve seat 35 around said air passage. Thus, the space in barrel 12 adjacent the head 13 is normally sealed.

When the device is to be employed as a pressure gauge, the clamping screw 29 is loosened. When the head 13 is applied in the usual manner to the mouth of a tire valve stem, the center stud 40 of the head 13 opens the tire valve, allowing air to flow through the passage 41 of the head and through the central aperture 42 of gasket 15. The air pressure moves the piston 18 to the right, as viewed in Figures 2 and 3, compressing spring 27 and causing the abutment element 38 to engage the abutment element 31, the spring 39 being of sufficient strength to transmit the force required to move rod 21 outwardly against the frictional resistance of the frictional elements 23 and 24. Thus, the rod 21 is moved outwardly by an amount determined by the degree of air pressure in the tire. When the head 13 is removed from the tire valve, the friction elements 23 and 24 hold the rod 21 in its extended position after spring 27 has expanded to return piston 18 to its normal position against gasket 15. A reading of the tire pressure may then be obtained from the scale 22.

When it is desired to bleed the tire to reduce its air pressure to a desired value, the rod 21 is manually moved to a position wherein said value is indicated by the scale 22, and the rod is locked in this position by manually tightening the screw 29. The head 13 is then applied to the mouth of the tire valve stem, whereby piston 18 is moved to the right, as viewed in Figures 2 and 3, by the air pressure in the tire. When the abutment element 38 engages the abutment element 31 on the end of the locked rod, the valve head 37 is disengaged from its seat, allowing the excess air pressure to be released through passage 34 and sleeve 33 to the portion of barrel 12 adjacent rod 21, and thence to the atmosphere, since said portion is not air-tight. When the pressure in the tire has been reduced sufficiently, the spring 27 expands to move the piston 18 to the left, as viewed in Figures 2 and 3, by an amount sufficient to disengage abutment element 38 from abutment element 31, whereby spring 39 causes valve head 37 to sealingly engage on its seat.

As will be readily apparent, the device may be calibrated by adjusting the abutment screw 31 in the cup member 30 so that the actual applied air pressure will agree with the graduations on the indicating scale 22.

While a specific embodiment of an improved combination tire pressure gauge and regulator has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A combination tire pressure gauge and pressure regulator comprising a tubular barrel provided at one end with an apertured head for engagement with the mouth of a tire valve stem and at its other end with an end wall element formed with a slot, a piston in said barrel adjacent said apertured head, a flat, graduated indicating rod extending slidably through the slot of said end wall element, friction means in said barrel adjacent said end wall element yieldably engaging said indicating rod, a coiled spring in said barrel surrounding said rod and bearing between said piston and said friction means, an outwardly projecting lug on said end wall element extending parallel to the slot and parallel to and adjacent to said indicating rod, a clamping screw threadedly engaged through said lug and being clampingly engageable with the indicating rod for at times rigidly locking the rod in a predetermined fixed position relative to the barrel, a normally closed movable valve on the piston, and an abutment element adjustably mounted on the inner end of the rod arranged to engage and open the valve responsive to the movement of the piston to a position adjacent the inner end of the locked rod.

2. A combination tire pressure gauge and pressure regulator comprising a tubular barrel provided at one end with an apertured head for engagement with the mouth of a tire valve stem and at its other end with an end wall element formed with a slot, a piston in said barrel adjacent said apertured head, a flat, graduated indicating rod extending slidably through the slot of said end wall element, friction means in said barrel adjacent said end wall element yieldably engaging said indicating rod, a coiled spring in said barrel surrounding said rod and bearing between said piston and said friction means, a normally closed valve on the piston, means opening said valve responsive to the movement of the piston against the inner end of the rod when the rod is held stationary, an outwardly projecting lug secured on said end wall element and extending parallel to said slot and adjacent to said indicating rod, and a clamping screw threadedly engaged through said lug and being clampingly engageable with the indicating rod for at times rigidly locking the rod in a predetermined stationary position relative to the barrel.

References Cited in the file of this patent

UNITED STATES PATENTS

| | | |
|---|---|---|
| 1,223,252 | Branz | Apr. 17, 1917 |
| 1,668,753 | Baker | May 8, 1928 |
| 1,866,140 | Wahl | July 5, 1932 |
| 2,427,199 | Crowley | Sept. 9, 1947 |

FOREIGN PATENTS

| | | |
|---|---|---|
| 541,819 | France | May 8, 1922 |